United States Patent
Smith et al.

(10) Patent No.: US 10,244,001 B2
(45) Date of Patent: *Mar. 26, 2019

(54) SYSTEM, APPARATUS AND METHOD FOR ACCESS CONTROL LIST PROCESSING IN A CONSTRAINED ENVIRONMENT

(71) Applicant: Intel Corporation, Santa Clara, CA (US)

(72) Inventors: Ned M. Smith, Beaverton, OR (US); Mats G. Agerstam, Portland, OR (US); Nathan Heldt-Sheller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 331 days.

This patent is subject to a terminal disclaimer.

(21) Appl. No.: 15/259,560

(22) Filed: Sep. 8, 2016

(65) Prior Publication Data

US 2016/0381081 A1    Dec. 29, 2016

Related U.S. Application Data

(63) Continuation of application No. 14/856,857, filed on Sep. 17, 2015, now Pat. No. 9,912,704.

(Continued)

(51) Int. Cl.
*G06F 21/10* (2013.01)
*G06F 21/31* (2013.01)
(Continued)

(52) U.S. Cl.
CPC .......... *H04L 63/205* (2013.01); *H04L 63/101* (2013.01); *H04W 12/08* (2013.01); *H04L 67/12* (2013.01); *H04W 4/70* (2018.02)

(58) Field of Classification Search
CPC ......... H04L 68/08; H04L 68/10; H04L 68/12; H04L 67/00; H04L 67/30; H04L 67/42;
(Continued)

(56) References Cited

U.S. PATENT DOCUMENTS 7,366,724 B2  4/2008  Frieden et al.
8,418,238 B2  4/2013  Platt et al.
(Continued)

FOREIGN PATENT DOCUMENTS

KR  1020130001776  1/2013
KR  1020130028323  3/2013
WO  2013128338     9/2013

OTHER PUBLICATIONS

International Searching Authority, "Notification of Transmittal of the International Search Report and the Written Opinion of the International Searching Authority," dated Aug. 8, 2016 in International application No. PCT/US2016/033831.

(Continued)

*Primary Examiner* — Joseph P Hirl
*Assistant Examiner* — Kalish K Bell
(74) *Attorney, Agent, or Firm* — Trop, Pruner & Hu, P.C.

(57) ABSTRACT

In one embodiment, a method includes receiving a first request from a first device to access a first resource of the system and determining whether to grant access to the first resource based on a first access control list stored in the system, the first access control list associated with the first device, the first device having a first relevance value, and based on the determination, granting the access to the first resource; and receiving a second request from a second device to access a second resource of the system and forwarding the second request to an access manager service coupled to the system to determine whether to grant access to the second resource based on a second access control list (Continued)

stored in the access manager service associated with the second device, the second device having a second relevance value, receive an access grant from the access manager service and based thereon, granting the access to the second resource.

20 Claims, 8 Drawing Sheets

Related U.S. Application Data

(60) Provisional application No. 62/172,906, filed on Jun. 9, 2015.

(51) Int. Cl.
*G06F 21/41* (2013.01)
*G06F 21/45* (2013.01)
*H04L 29/06* (2006.01)
*H04W 12/08* (2009.01)
*H04L 29/08* (2006.01)
*H04W 4/70* (2018.01)

(58) Field of Classification Search
CPC ......... H04L 68/20; G06F 21/10; G06F 21/31; G06F 21/41; G06F 21/45
See application file for complete search history.

(56) References Cited

U.S. PATENT DOCUMENTS

| | | | |
|---|---|---|---|
| 2003/0088786 | A1 | 5/2003 | Moran |
| 2005/0129019 | A1* | 6/2005 | Cheriton ............. H04L 63/0272 370/392 |
| 2006/0120526 | A1 | 6/2006 | Boucher |
| 2007/0124482 | A1 | 5/2007 | Lee et al. |
| 2007/0233957 | A1 | 10/2007 | Lev-Ran et al. |
| 2007/0271362 | A1* | 11/2007 | Bamnolker ......... H04L 63/0263 709/223 |
| 2007/0277228 | A1 | 11/2007 | Curtis et al. |
| 2008/0022354 | A1* | 1/2008 | Grewal ................. H04W 12/06 726/1 |
| 2008/0109897 | A1 | 5/2008 | Moran et al. |
| 2009/0249440 | A1 | 10/2009 | Platt |
| 2009/0288140 | A1* | 11/2009 | Huber ................. G06Q 20/1235 726/2 |
| 2011/0137947 | A1* | 6/2011 | Dawson ................ G06F 21/604 707/785 |
| 2011/0162057 | A1 | 6/2011 | Gottumukkala et al. |
| 2011/0321123 | A1 | 12/2011 | Ishikawa |
| 2012/0042362 | A1 | 2/2012 | Vlasov |
| 2013/0067544 | A1 | 3/2013 | Kwark et al. |
| 2013/0239172 | A1 | 9/2013 | Murakumi |
| 2013/0246470 | A1 | 9/2013 | Rice |
| 2013/0283342 | A1 | 10/2013 | Ellison |
| 2014/0324973 | A1 | 10/2014 | Goel et al. |
| 2015/0249672 | A1* | 9/2015 | Burns ..................... H04L 12/66 726/4 |
| 2016/0087956 | A1 | 3/2016 | Maheshwari |
| 2016/0088021 | A1 | 3/2016 | Jayanti Venkata |
| 2016/0366183 | A1 | 12/2016 | Smith et al. |
| 2017/0257362 | A1 | 9/2017 | Maheshwari |

OTHER PUBLICATIONS

Wikipedia, "OSI Model", https://en.wikipedia.org/wiki/OSI_model#Layer_4:_Transport_Layer, Jun. 8, 2015, 7 pages.
Wikipedia, "Key Management", https://en.wikipedia.org/wiki/Key_management, May 19, 2015, 5 pages.
Wikipedia, "Publish-Subscribe Pattern", https://en.wikipedia.org/wiki/Publish%E2%80%93subscribe_pattern, Mar. 18, 2015, 4 pages.
Wikipedia, "Data Distribution Service", https://en.wikipedia.org/wiki/Data_Distribution_Service, May 21, 2015, 5 pages.
Wikipedia, "Kerberos (Protocol)", https://en.wikipedia.org/wiki/Kerberos_%28protocol%29, May 7, 2015, 6 pages.
Stackexchange, "Cryptography", http://crypto.stackexchange.com/questions/3682/how-can-the-diffie-hellman-key-exchange-be-extended-to-three-parties, Aug. 30, 2012, 1 page.
Wikipedia, "XMPP", https://en.wikipedia.org/wiki/XMPP, May 22, 2015, 7 pages.
IBM Mobilefirst, "Pairwise and Group Keys", http://etutorials.org/Networking/802.11+security.+wi-fi+protected+access+and+802.11i/Part+II+The+Design+of+Wi-Fi+Security/Chapter+10.+WPA+and+RSN+Key+Hierarchy/Pairwise+and+Group+Keys/, accessed Sep. 3, 2015, 6 pages.
Hardjono, et al., "Fluffy: Simpltfied Key Exchange for Constrained Environments", draft-hardjono-ace-fluffy-00, Mar. 23, 2015, 24 pages, Intel Corporation.
openinterconnect.org, "Open Interconnect Consortium: An Overview to Connect Devices Everywhere", http://openinterconnect.org/wp-content/uploacis/2015/07/Open-Interconnect-ConsortiumOverview_Final.pdf, Jul. 2015, 7 pages.
openinterconnect.org, "The Open Interconnect Consortium and IoTivity", http://openinterconnect.org/wp-content/uploads/2015/07/OIC-IoTivity_White-Paper_Final1pdf, Jul. 2015, 5 pages.
openinterconnect.org, "Cloud-Native Architecture and the Internet of Things", http://openinterconnect.org/wp-content/uploads/2015/07/Cloud-Native-IoT-White-Paper_white_centered_Final.pdf, Jul. 2015, 3 pages.
openinterconnect.org, " Freedom to Implement: OIC and IoTivity", http://openinterconnect.org/wp-content/ uploads/2015/07/OIC-IoT-Standards-and-Implementation_White-Paper_Final.pdf, Jul. 2015, 2 pages.
U.S. Appl. No. 14/863,043, filed Sep. 23, 2015, entitled "System, Apparatus and Method for Group Key Distribution on for a Network" by Ned M. Smith.
U.S. Appl. No. 14/864,940, filed Sep. 25, 2015, entitled "System, Apparatus and Method for Secure Network Bridging Using a Rendezvous Service and Multiple Key Distribution Servers" by Ned M. Smith, et al.
U.S. Appl. No. 14/864,957, filed Sep. 25, 2015, entitled "System, Apparatus and Method for Managing Lifecycle of Secure Publish-Subscribe System" by Ned M. Smith, et al.
U.S. Appl. No. 14/865,576, filed Sep. 25, 2015, entitled "System, Apparatus and Method for Secure Coordination of a Rendezvous Point for Distributed Devices Using Entropy Multiplexing" by Ned M. Smith, et al.
U.S. Appl. No. 14/865,191, filed Sep. 25, 2015, entitled "System, Apparatus and Method for Multi-Owner Transfer of Ownership of a Device" by Jesse Walker, et al.
U.S. Appl. No. 14/865,198, filed Sep. 25, 2015, entitled "System, Apparatus and Method for Transferring Ownership of a Device From Manufacturer to User Using an Embedded Resource" by Ned M. Smith, et al.
U.S. Appl. No. 14/859,572, filed Sep. 21, 2015, entitled "System, Apparatus and Method for Privacy Preserving Distributed Attestation for Devices" by Ned M. Smith, et al.
U.S. Appl. No. 14/863,496, filed Sep. 24, 2015, entitled "System, Apparatus and Method for Stateful Application of Control Data in a Device" by Nathan Heldt-Sheller, et al.
U.S. Appl. No. 14/998,275, filed Dec. 26, 2015, entitled "System, Apparatus and Method for Auto-Optimization of Access Control Policy and Key Management in a Network Authoring Tool" by Ned M. Smith, et al.
U.S. Appl. No. 15/045,676, filed Feb. 17, 2016, entitled "System, Apparatus and Method for Security Interoperability Path Analysis in an Internet of Things (IOT) Network" by Ned M. Smith, et al.
U.S. Appl. No. 62/172,962, filed Jun. 9, 2015, entitled "Providing Protected content in an IoT Network" by Ned M. Smith, et al.
U.S. Appl. No. 14/968,125, filed Dec. 14, 2015, entitled "A Self-Configuring Key Management System for an Internet of Things Network" by Ned M. Smith.

(56) References Cited

OTHER PUBLICATIONS

U.S. Appl. No. 14/757,750, filed Dec. 23, 2015, entitled "System, Apparatus and Method for Optimizing Symmetric Key Cache Using Tickets Issued by a Certificate Status Check Service Provider" by Ned M. Smith, et al.
U.S. Appl. No. 14/976,165, filed Dec. 21, 2015, entitled "System, Apparatus and Method for Migrating a Device Having a Platform Group" by Ned M. Smith, et al.
U.S. Appl. No. 14/977,742, filed Dec. 22, 2015, entitled "System, Apparatus and Method for Safety State Management of Internet Things (IoT) Devices " by Ned M. Smith, et al.
Wikipedia, "Tor", https://en.wikipedia.org/wiki/Tor_%28anonymity_network%29 , Jun. 4, 2015, 14 pages.
Networkworld, "A guide to the confusing Internet of Things standards world", http://www.networkworld.com/article/2456421/internet-of-things/a-guide-to-the-confusing-internet-of-things-standards-world.html, Jul. 21, 2014, 7 pages.
United States Patent and Trademark Office, Notice of Allowance dated Oct. 25, 2017, in U.S. Appl. No. 14/856,857.
Li, et al., "Smart Community: An Internet of Things Application", in IEEE Communications Magazine, vol. 49, No. 11, Nov. 2011, pp. 68-75.
United States Patent and Trademark Office, Non-Final Office Action dated Jun. 15, 2018 in U.S. Appl. No. 15/168,609.
International Searching Authority, "Notification of Transmittal of the International Search Report and the Written Opinion of the International Searching Authority," dated Sep. 21, 2016, in International application No. PCT/2016/035266.
Mahalle, et al., "Identity driven capability based access control (ICAC) scheme for the Internet of Things", Advanced Networks and Telecommuncations Systems (ANTS), 2012 IEEE International Conference on, IEEE, Dec. 16, 2012 (2012-12-t6), pp. 49-54, XP032419350, DOI : 10. 1109/ANTS.2012.6524227, ISBN: 978-1-4673-5130-0.
Suominen, "Access Control for Internet of Things", Internet Citation, May 25, 2015 (May 25, 2015), four pages XP002781048, URL: https//www.intopalo.com/blog/2015-05-25-access-control-for-internet-of-things/.
European Patent Office, Extended European Search Report dated Nov. 12, 2018 in European Patent Application No. 16808012.5.
United States Patent and Trademark Office, Final Office Action dated Jan. 4, 2019 in U.S. Appl. No. 15/168,609.

\* cited by examiner

SYSTEM, APPARATUS AND METHOD FOR ACCESS CONTROL LIST PROCESSING IN A CONSTRAINED ENVIRONMENT

This application is a continuation of U.S. patent application Ser. No. 14/856,857, filed Sep. 17, 2015, which claims priority to U.S. Provisional Patent Application No. 62/172,906, filed on Jun. 9, 2015, in the names of Ned M. Smith, Mats G. Agerstam and Nathan Heldt-Sheller, entitled SYSTEM, APPARATUS AND METHOD FOR ACCESS CONTROL LIST PROCESSING IN A CONSTRAINED ENVIRONMENT, the disclosure of which is hereby incorporated by reference.

BACKGROUND

Internet of Things (IoT) networks, unlike enterprise and cloud networks, are expected to function even when central servers fail or are not available. IoT networks may be designed to be survivable under adverse conditions; for example, while a building may be burning down, partially destroyed due to acts of nature or due to physical world mishap. Damage to one part of a building, resulting in damage to the IoT network there, should not result in failure of the IoT network in an untouched part of the building. Security mechanisms are among the features to retain operational integrity during survivability situations.

DETAILED DESCRIPTION

Figure 1:
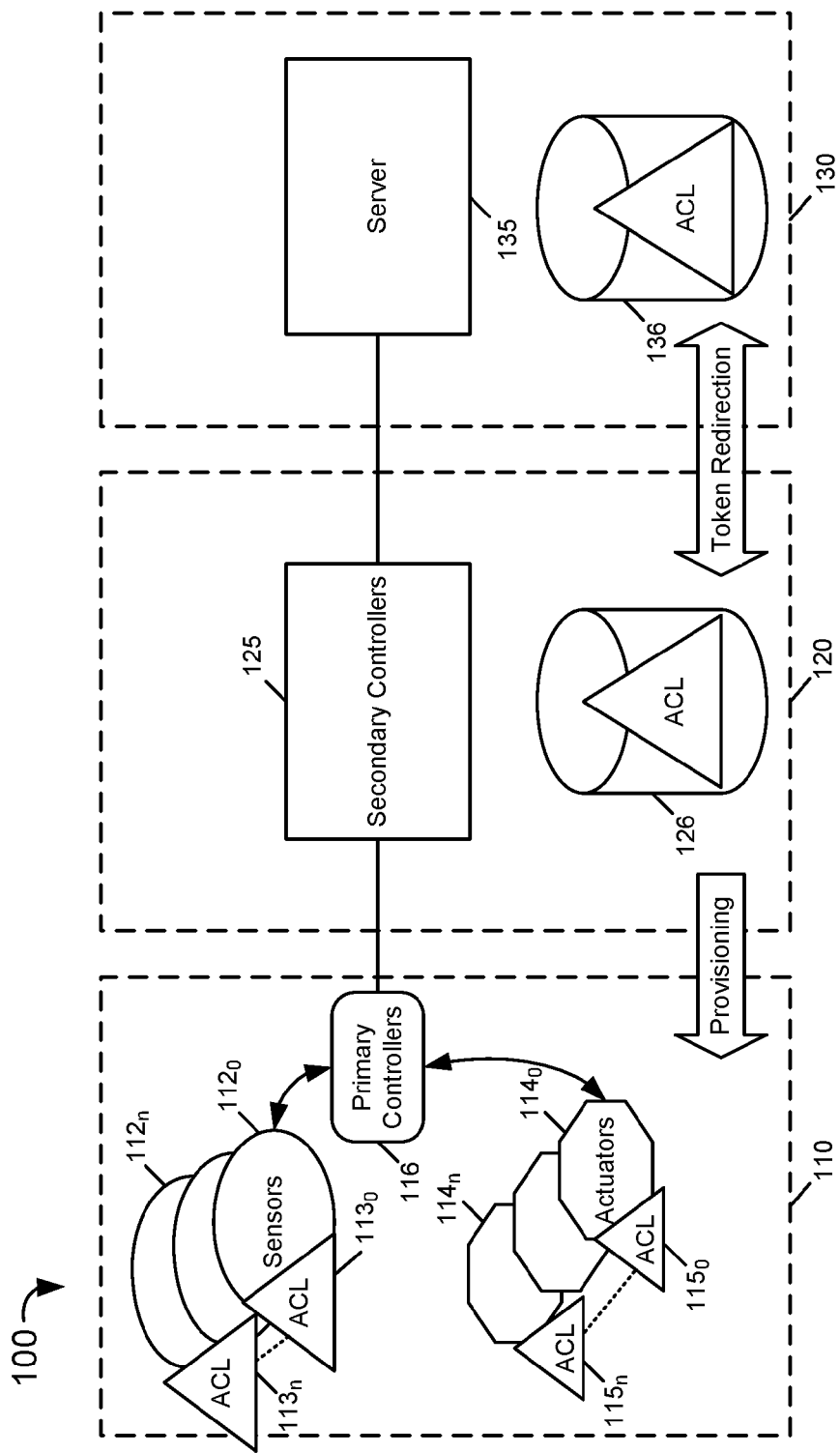
FIG. 1 is a block diagram of a system in accordance with an embodiment.

In various embodiments, a system of access control policies are simplified for IoT class devices. Still further, varying degrees of distribution and coalescence are provided so that as much of the access control decision making can be applied as close to the device as possible (resources permitting) if not directly by the device itself.

Embodiments define access policies using the same nouns and verbs (e.g., resources and constrained application protocol (CoAP) commands) used to describe IoT device interactions so that a mapping or translation to an access control grammar such as extensible access control markup language (XACML), open authorization (OAuth), security assertion markup language (SAML), etc., is avoided. Processing resource access requests is applied by the endpoint device, also known as the resource server. Access control policy lists (ACL) resources capture the device-to-resource interaction semantic and apply an allow/deny policy expressed in terms of the possible ways in which the resource may be manipulated (e.g., CRUDN, Create, Read, Update, Delete and Notify). Other actions are envisioned as IoT device interaction semantics evolve.

Note that a representation of the ACL may be considered to be an IoT resource as well. This abstraction allows security operations to be performed using the same IoT messaging mechanisms that are used to interact with application resources. In this way, greater interoperability and more effective use of system resources such as memory and storage are achieved.

IoT devices are often resource constrained, therefore a tradeoff is made regarding how much of the device resources are used to achieve resilience properties vs. scalability properties. For example, a locally stored ACL enables the device to process access control requests even when connectivity to the rest of network is blocked or when the authorization server(s) are down. However, since devices are resource limited, only a small number of ACLs can reside locally. Scalability goals may partition requestors into categories of resiliency where access by devices that may protect critical infrastructure, preserve life or protect property assets may occupy local resources. Less critical functioning devices may employ access control mechanisms that refer the access decision to a nearby, but less resource limited IoT device. The price of scalability is the network latency and single point of failure cost of having to rely on a neighboring IoT device. Still another class of devices may rely on a central service to issue ACL policies, but these may occupy device resources temporarily. During the validity period, connection to the central facility may be severed but access control is maintained. Fully scalable solutions rely on a central service for all ACL processing and decision making. Failure in the connectivity or operation of the central policy service results in device access failure.

Using an embodiment, access control mechanisms can be tailored to IoT network topologies. For example, device resources can be partitioned according to device function as it relates to resilience objectives. In particular: ACL structures are expressed in the same format as device resources and range of function; ACL structures can be distributed across many devices; ACL structures can be self-contained such that the endpoint device can fully apply the policy (without network connectivity beyond what is available between the requesting device and the local resource server); ACL structures can be split into a local component and a remote component where the remote component identifies a helper device that is nearby according to the device topology; ACL structures can be dynamically provisioned and locally cached/stored such that the space occupied can be reused according to a heat graph of requesting devices; ACL structures can be hosted by a remote device such that all requests from a particular requestor are forwarded to a designated device; ACL structures may be hosted by a remote device such that the requesting device is redirected to the remote device to obtain a single use token granting access to a specific resource or property of the device.

In an embodiment, selection of which ACL structure to use is determined by a network setup utility that assists the network designer in determining which device functions are useful for protecting critical infrastructure, semi-critical infrastructure, preserves human life, protects health and physical property. A determination may be made regarding a weighing of resiliency vs. scalability in terms of potential impact to physical assets and cyber assets.

Referring now to FIG. 1, shown is a block diagram of a system in accordance with an embodiment. IoT networks are often composed of sub-networks where a portion of the network is tailored for improved resiliency, availability and safety of IoT command-and-control, while other parts of the network are optimized for improved mobility, data availability and integrity. Consequently, the access management system may be configured to accommodate these differences and design objectives.

In the illustration of FIG. 1, a system 100 includes various components that connect together in a network architecture. A first network portion 110 is configured for autonomous operation of various devices such as IoT devices within this network portion. By way of the distributed arrangement of network 100, a security policy may be distributed across a hierarchy of nodes within different network portions. In this way, high availability low latency security decisions can be made locally in first network portion 110, while greater amounts of latency and lower availability may adhere as security decisions are distributed across different portions of the network.

As further illustrated, network 100 includes a second network portion 120, which may be configured to provide semi-autonomous operation for ACL security decisions. Still further, a third network portion 130 provides for higher latency ACL security decisions to be made, such as according to a traditional client-server model, e.g., for non-safety and/or non-critical operations.

As seen, such devices may include a plurality of sensor devices $112_0$-$112_n$ and a plurality of actuator devices $114_0$-$114_n$. In general, sensor devices 112 may be configured to sense one or more particular conditions, such as one or more environmental conditions, operating conditions associated with it or another device or so forth. In general, actuators 114 may be configured to perform some type of sensing operation and perform one or more actions based on one or more sensed parameters. To provide for autonomous operation including ACL processing, each of these devices may include an internal storage to store corresponding ACLs, shown as ACLs $113_0$-$113_n$ each included one of sensor devices 112, and ACLs $115_0$-$115_n$ each included in one of actuator devices 114. As such, sensors 112 and actuators 115 may act as their own security enforcement point by way of this included ACL.

To enable networking operations, including status, control and other operations to efficiently occur, each of sensors 112 and actuators 114 may couple to one or more primary controllers 116. In general, primary controllers 116 may provide control information to the corresponding sensor devices and actuator devices, as well as receiving reports from these devices, which may be used in making command decisions, as well as providing information to further portions of the network. In various embodiments, primary controllers 116 may be configured as a controller such as a given hardware circuit to provide control actions to sensors 112 and actuators 115. Still further, primary controllers 116 may receive updates to one or more security policies and apply such updated security policy to the sensors and/or actuators.

In the illustration of FIG. 1, second network portion 120 may be configured to include various components, including one or more secondary controllers 125. In an embodiment, such secondary controllers may be various types of computing devices, such as a smartphone, tablet computer, personal computer, server computer or so forth, gateway or other network device. Secondary controllers 125 may include or may be associated with a cache memory 126 that may store ACLs as described herein. In some cases, at least some amounts of ACLs stored in cache memory 126 may be provisioned, e.g., at least temporarily, to one or more of sensor devices 112 and/or actuators 114 within first network portion 110.

As further illustrated, requests for resource access may be either generated within secondary controllers 125 or received from devices within first network portion 110, may be routed to third network portion 130. In various embodiments, third network portion 130 may be formed of a traditional client-server model, in which one or more computing devices 135, which may be implemented as one or more server computers (as an example) are present. Central server 135 may be configured to provide a centralized security policy for network 100 and enable distribution of various security determination and enforcement actions to other devices with the network. In various embodiments, server computers 135 may provide various services, including cloud services, enterprise services, factory floor services and so forth. As seen, server computers 135 may include or otherwise be associated with a storage 136, which in one embodiment may take the form of a cache memory. In various embodiments, this database in storage 136 may be the authoritative database for all ACLs for a given network. To this end, responsive to requests for ACL processing, server computers 135 may send authentication tokens, which may be single use tokens to grant access to a requested resource of a given device, or responsive to a request for an ACL itself, an ACL can be dynamically provisioned to the device, at least temporarily.

Embodiments achieve security goals by supporting multiple approaches to ACL management and operation. IoT networks that operate autonomously have low-latency in decision making and control. Resource access decision overhead is to be minimized. Network latency is a major consideration in the overall latency budget. Embodiments may eliminate network latency by storing ACLs in sensors and actuators, closest to where the resources are hosted. For semi-autonomous operation, a secondary controller is responsible for maintaining access control policy due to expected frequency of policy update. Nevertheless, efficient low-latency operation may be implemented for a period of time or for a specific set of devices. In this scenario, a temporary ACL may be provisioned to the autonomous operating devices while tasks that are not safety critical may depend on the secondary controller being available. If unavailable, access decisions are put on hold, with minimal negative impact to safety critical functions.

For non-safety critical operation, a more traditional client-server approach may suffice where, for each access request, an authorization token may be constructed and presented to the resource host for evaluation. The resource host may validate the service issuing the token in order to determine whether the request is authorized. However, the trade-off is multiple exchanges that incur network latency at each exchange. Hence, real-time and near real-time control applications cannot be satisfied using client-server operation. However, if large number of requesting entities exists, the server can scale to satisfy the volume.

Figure 2:
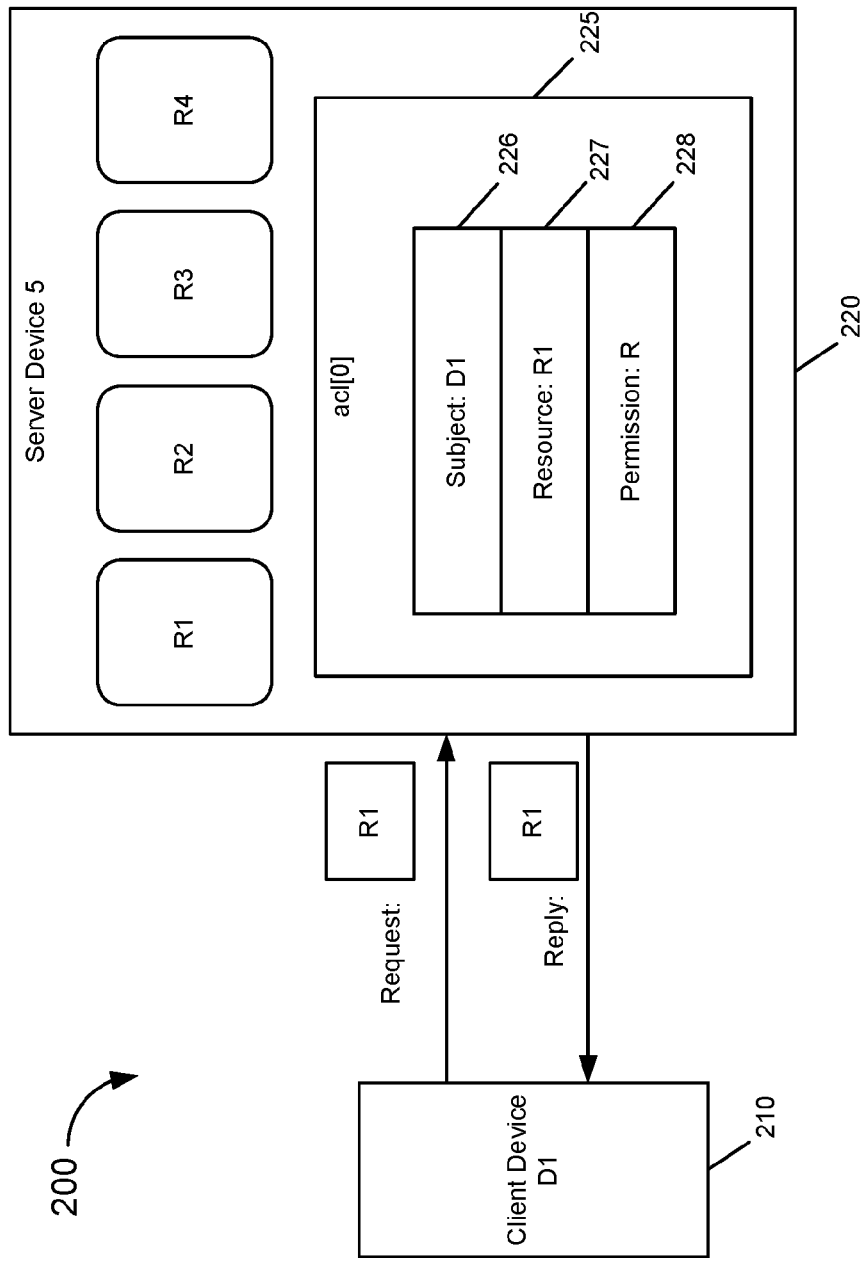
FIG. 2 is a block diagram of an implementation of local ACL in accordance with an embodiment.
Figure 3:
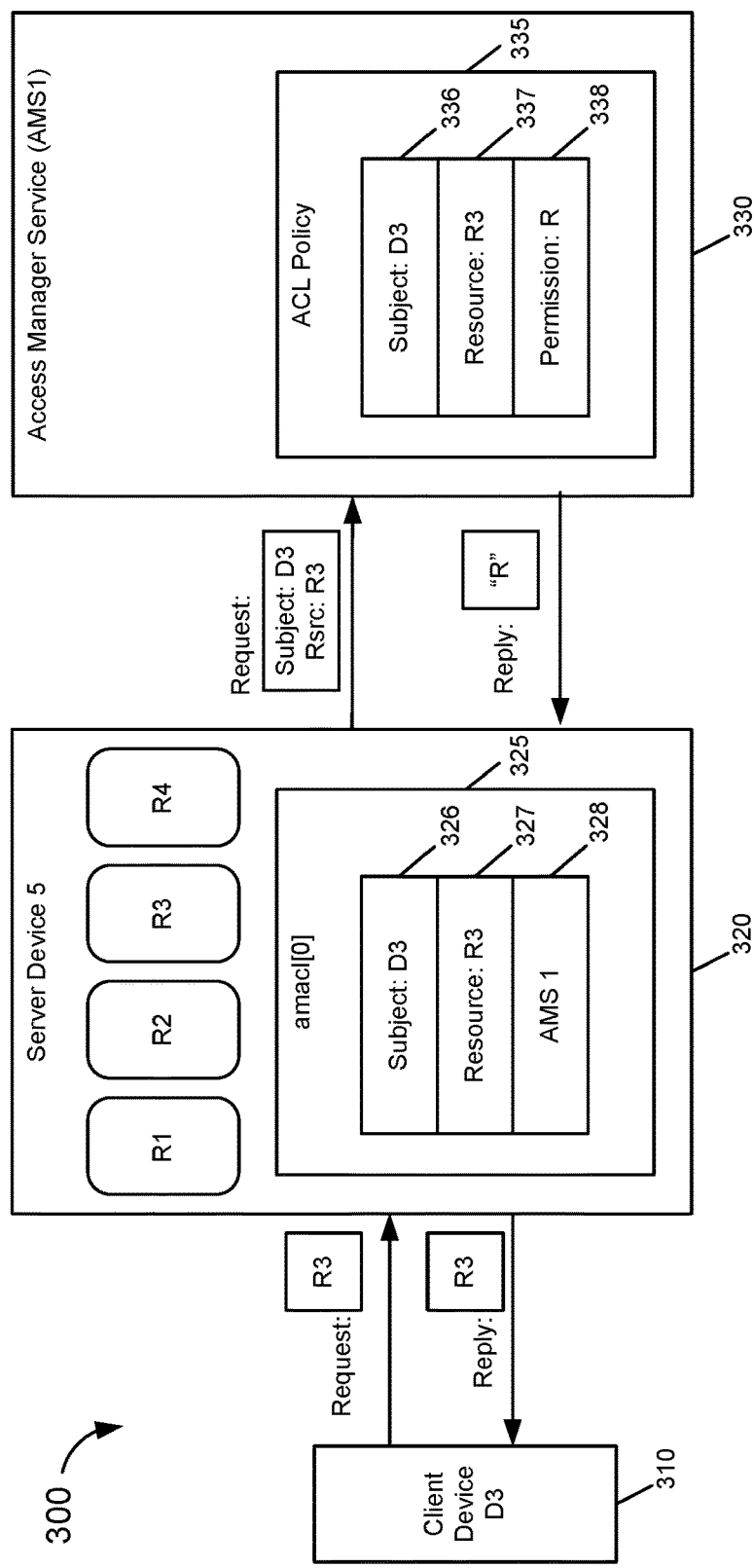
FIG. 3 is a block diagram of an implementation of local ACL with remote decision making in accordance with an embodiment.
Figure 4:
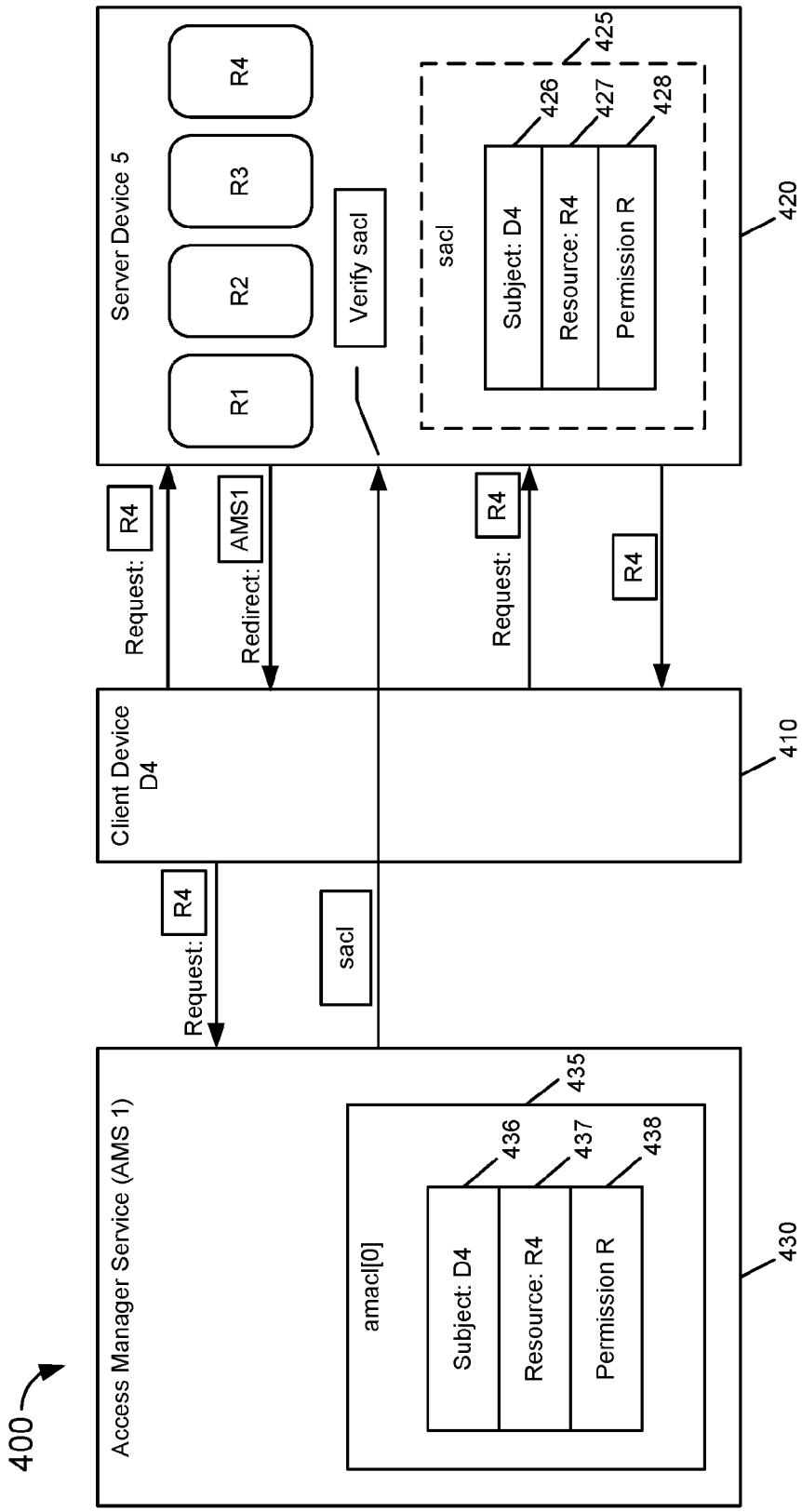
FIG. 4 is a block diagram of an implementation of ACL redirection in accordance with an embodiment.

Referring now to FIGS. 2-4, shown are different techniques for evaluating ACL policies in accordance with embodiments. Note that each technique may be tuned for a particular operational optimization goal.

FIG. 2 is a block diagram of an implementation of local ACL, which may support the highest safety requirements. The device D1 (client device 210) requests access to a resource R1 hosted by the resource server (Device 5) (server device 220). The local host ACL policy allows R(ead) access to R1. This policy is evaluated without additional network latency.

As shown in FIG. 2, arrangement 200 includes a client device 210 and a server device 220. In general, client device 210 may be a requester of a resource available in server device 220. Understand that the client and server devices can take many different forms in different embodiments. However, for purposes of illustration herein, assume that client device 210 is a requesting device such as a primary or secondary controller (such as described in FIG. 1) and that server device 220 is a given IoT device such as a sensor device or an actuator device (such as described in FIG. 1), which in the case shown includes a resident ACL 225. As seen, client device 210 issues a request for access to a particular resource R1 of resources R1-R5 included in server device 220. In turn, server device 220 accesses ACL 225. As seen, ACL 225 includes various fields, including a subject field 226, a resource field 227, and a permission field 228. As seen, subject field 226 identifies a source of a request and here identifies client device 210. Resource field 227 identifies one or more resources that may be accessed by the subject, here including requested resource R1, which may be a data value stored in a particular location, such as a sensor register or other storage. In turn, permission field 228 indicates the type of permission to be granted. In this instance a read (R) permission is granted. As such, the requested resource, R1, is provided in a reply from server device 220 to client device 210. Note that permission field 228 may indicate one or more particular types of permissions to be granted. In embodiments of IoT devices, such permissions may include, in addition to CRUDN (create read update delete and notify), an additional permission to allow publication, and thus a publish permission may be provided. Note that in some cases an ACL structure can be split into a local component (ACL 225) and a remote component, where the remote component identifies a helper device that may be within a local area or otherwise associated with the device, according to a device topology. Stated another way, the local component may be used to match resources residing locally, but depends on the remote service to supply access permission guidances.

FIG. 3 is a block diagram of an implementation of local ACL with remote decision making, which may support moderately high resiliency and safety goals. In this implementation, the client device D3 (310) requests access to a resource R3 hosted by device D5 (320), but according to an ACL entry 325 (with subject, resource and distribution fields 326, 327, 328) the access decision is distributed to an Access Manager Service (AMS1) 330. The AMS has an ACL policy 335 (with subject, resource, and permission fields, 336, 337, and 338) that specifies D3's access rights. The original request is relayed to AMS1 by D5 and a response R(ead) is returned. Additional network latency is incurred for the relayed request and response, but since the AMS1 is somewhat near D5, given resiliency and safety goals can be met. Note that in various embodiments, access manager service 330 may be a secondary controller (such as shown in FIG. 1) or a traditional server (also shown in FIG. 1).

FIG. 4 is a block diagram of an implementation of ACL redirection, which may support lower expectations of resiliency. Here, a requesting device D4 (410) requests access to resource R4 hosted by D5 (420). Initially, D5 does not possess a suitable ACL policy therefore the request is denied or redirected to an Access Manager Service (AMS1) (430). This situation thus may reflect an on demand provisioning flow in which in this initial instance, server device 420 does not have a stored ACL for this subject device. D4 presents the request to the AMS that in turn issues/signs a temporal ACL that satisfies the request. D4 delivers the signed ACL to D5, and then retries the request. Thus as seen in the dashed box of FIG. 4, server device 420 receives and stores ACL 425, including constituent subject field 426, resource field 427, and permission field 428. This time the request succeeds. Subsequent requests of the same content may also succeed so long as the ACL signature is valid. Thus this cached copy 425 of the ACL may be stored, at least temporarily, in server device 420 to enable reduced latency for further requests. A variation of this technique may produce a token that contains authorization for a one-time-use permission allowing access. This may be a hybrid of FIGS. 3 and 4, and may limit access to a specific property or interface defined by the resource.

Figure 5:
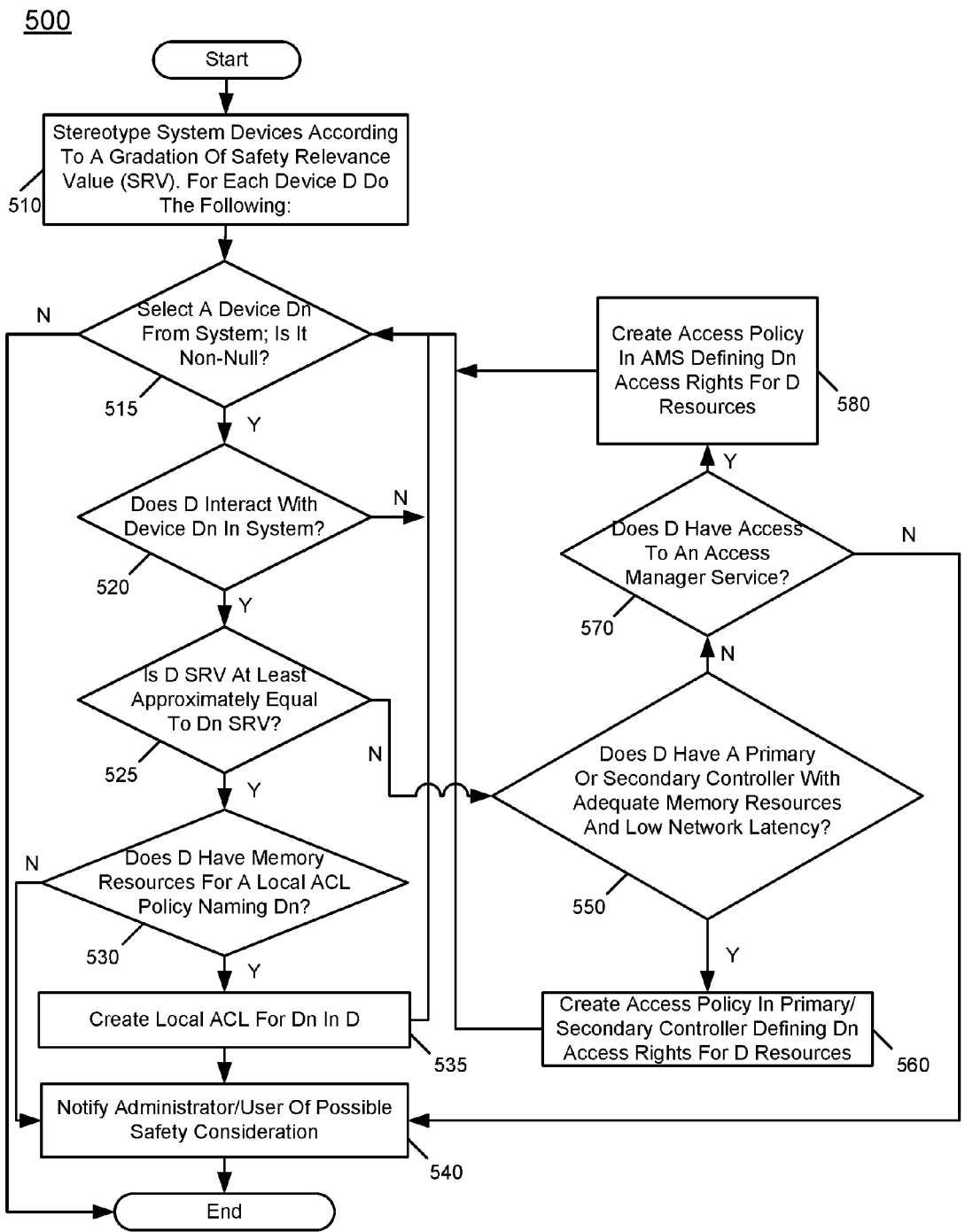
FIG. 5 is a flow diagram of a resource optimization method in accordance with an embodiment.

Embodiments may further determine how best to utilize constrained resources of the various sensors, actuators controllers and other servers to optimize for safety and resiliency. Referring now to FIG. 5 shown is a flow diagram of a resource optimization method in accordance with an embodiment, which may be used to ensure safe and resilient operation given limited device resources.

As one example, method 500 may be performed via a network setup utility that assists a network designer in determining which device functions can be used to protect a variety of resources. In some cases, this utility may be used during network design, as well as on-boarding of a device into a network, which may occur dynamically during system operation of an already configured network, such as a distributed network as described herein.

As seen, method 500 begins by stereotyping system devices according to a gradation of safety relevance values (SRVs) (block 510). As one example, devices may be identified as being safety relevant as to whether they perform one or more safety critical functions. For example, an emergency escape route may include emergency path lighting so that an escapee can find the escape route while crawling below a smoke line. Further, the escape route may have doors that automatically close to prevent the spread of fire. And further, doors that are activated for a fire emergency are prevented from locking closed so as not to block an escape route. A safety classification scheme further may involve assignment of a safety class rating, where a device is labeled during deployment as being L, M or Highly relevant to a safety consideration. For example, devices with a H rating may be given preferential access to encryption key storage resources, access policies and CPU scheduling on a local device to better ensure safety critical operations can complete execution with minimal external dependencies. Such designations may further involve application of a different security model, such as one that minimizes reliance on external supporting services such as an AMS.

In other cases, low, medium and high levels may be assigned to devices. In any event, after assigning relevance values to the given devices (safety and/or otherwise) within the network, an access control policy generation loop may be performed for each device D.

As seen, this loop may begin by selecting a device Dn from a list of devices of the system and determining whether this list is non-null (diamond 515). If not, control passes to diamond 520 to determine whether device D interacts with device Dn. If so, control passes to diamond 525 where it can be determined whether the safety relevance values of these two devices are at least approximately equal. Device-device interactions involving H-H interactions may be given scheduling and network bandwidth preferences over M-M or L-L.

At diamond 325, it can be established that H safety labeled devices are given preference for locality operation. That is to say, local resources are assigned to H tasks first and if a constrained environment is fully allocated and there are other H operations to be performed, the next closest locality (e.g., secondary controller) will give preference to H requests and possibly forward M or L requests to a next hop away locality controller, and so forth. Based on the determination at diamond 525, control passes to diamond 530 to determine whether device D has sufficient memory resources to store a local ACL policy that names Dn as its subject. If so, control passes to block 535 where a local ACL may be created and stored in device D for device Dn. As described above, this ACL may store various fields including a subject field, a resource field and a permission field, at least. Control then passes back to diamond 515, discussed above.

Note that if it is determined at diamond 530 that device D does not have sufficient memory resources, control passes to block 540 where an administrator/user may be notified of a possible safety consideration. Responsive to this notification, a safety log may be created alerting safety auditors of network conditions that could be an indication of 'weaknesses' in the safety design of the network. Review of safety logs may result in a re-design of the network to remove safety gaps. Note that if at diamond 525 it is determined that the SRVs are not at least approximately equal, control passes to diamond 550. Device interactions that have safety parity (H-H) interactions are given preference over M-M or L-L. Note that H-M or H-L interactions may be given priority over M-M or L-L. Writing a safety relevant event to a log may be an instance of a H-M or H-L relationship.

At diamond 550 it may be determined whether there is a primary or secondary controller coupled to device D that has sufficient memory resources to handle maintenance of an access control policy for device Dn, and also displays low network latency to device D. With reference back to FIG. 1, such primary or secondary controllers may be located in first network portion 110 or second network portion 120, as examples. If such primary or secondary controller exists, control passes to block 560 where an access policy may be created in such controller that defines access rights for the resources of device D. Such one or more ACLs thus may be stored in or associated with such controllers.

Otherwise if at diamond 550 it is determined that there is no available primary or secondary controller, control passes to diamond 570 to determine whether device D has access to an access manager service. If so, control passes to block 580 where an access policy can be created in the access manager service that defines Dn's access rights for D's resources. Thus such ACLs may be stored and/or associated with this access manager service. If no such access manager service is available for access by device D, control instead passes to block 540, discussed above. Understand while shown at this high level in the embodiment of FIG. 5, many variations and alternatives are possible.

Embodiments may thus provide a combination of access control techniques aimed at IoT class devices that have limited resources and may have strong requirements for safe operation where network latencies may prevent existing (Internet) approaches to authorization management. More specifically, ACLs provisioned into local device memory may be used where access decisions can be evaluated quickly for requesters that are stereotyped as requiring strong safety properties. ACLs also may be provisioned in a primary or secondary controller where the ACL policy is close to the resource server in which the access decision is applied.

In embodiments, an access management service may dynamically construct a locally evaluated ACL and specify a lifetime, where subsequent requests by a given device may be honored without incurring network latency overhead within the lifetime. An access management service also may issue a token that authorizes access to a resource or a property of that resource for a one-time-use basis. Embodiments may also use an IoT network management and provisioning utility to establish a safety relevance value that is also used to manage limited device resources optimized for safe operation while also preserving secure operation. As such, an ACL representation can be distributed according to the topology of an IoT network and available device resources.

Figure 6:
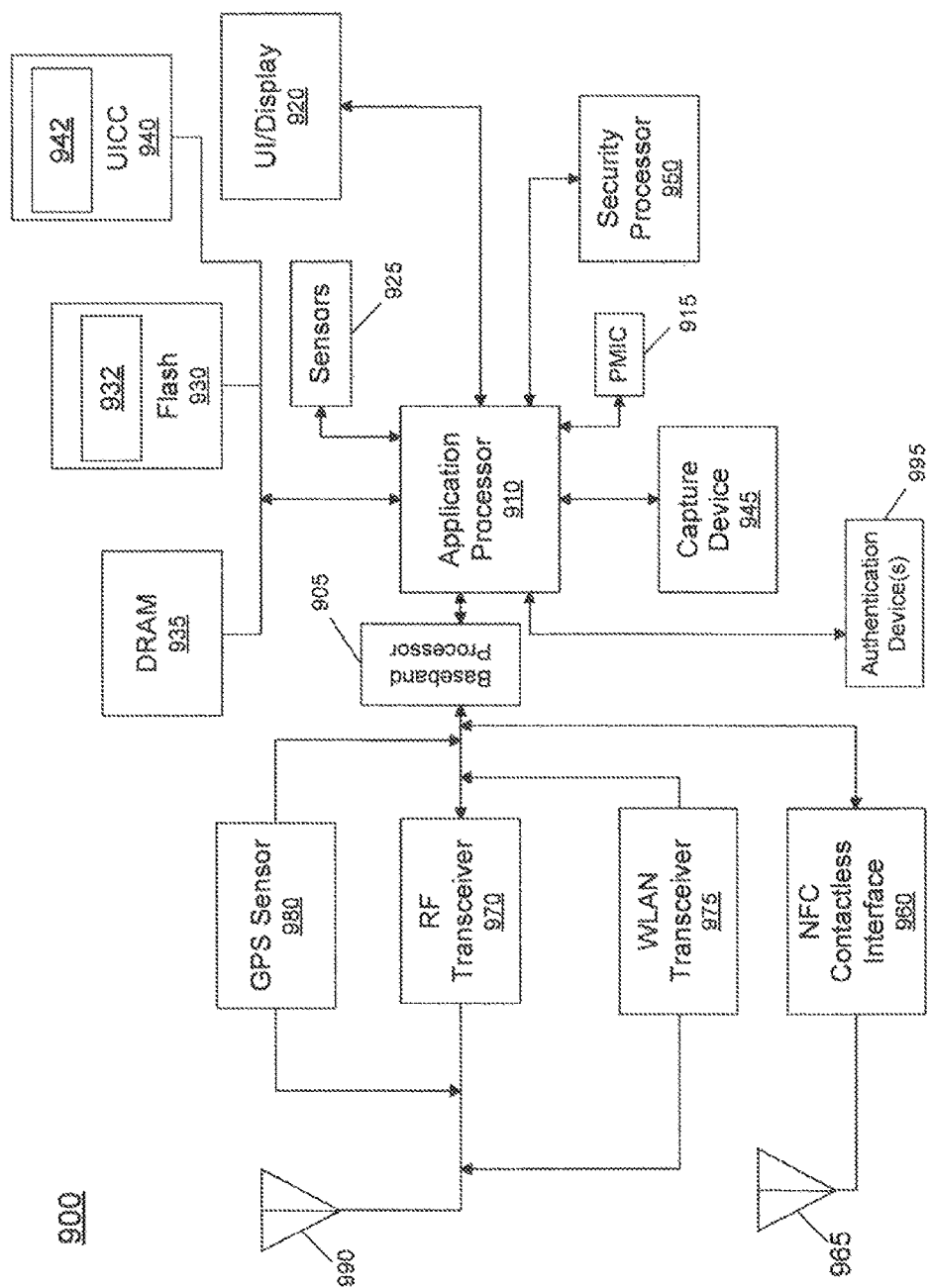
FIG. 6 is a block diagram of an example system with which embodiments can be used.

Referring now to FIG. 6, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 6, a universal integrated circuit card (UICC) 940 comprises a subscriber identity module, which in some embodiments includes a secure storage 942 to store secure user information. System 900 may further include a security processor 950 that may implement a TEE as described earlier, and which may couple to application processor 910. Furthermore, application processor 910 may implement a secure mode of operation, such as Intel® SGX for hosting of a TEE, as described earlier. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 6, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 7:
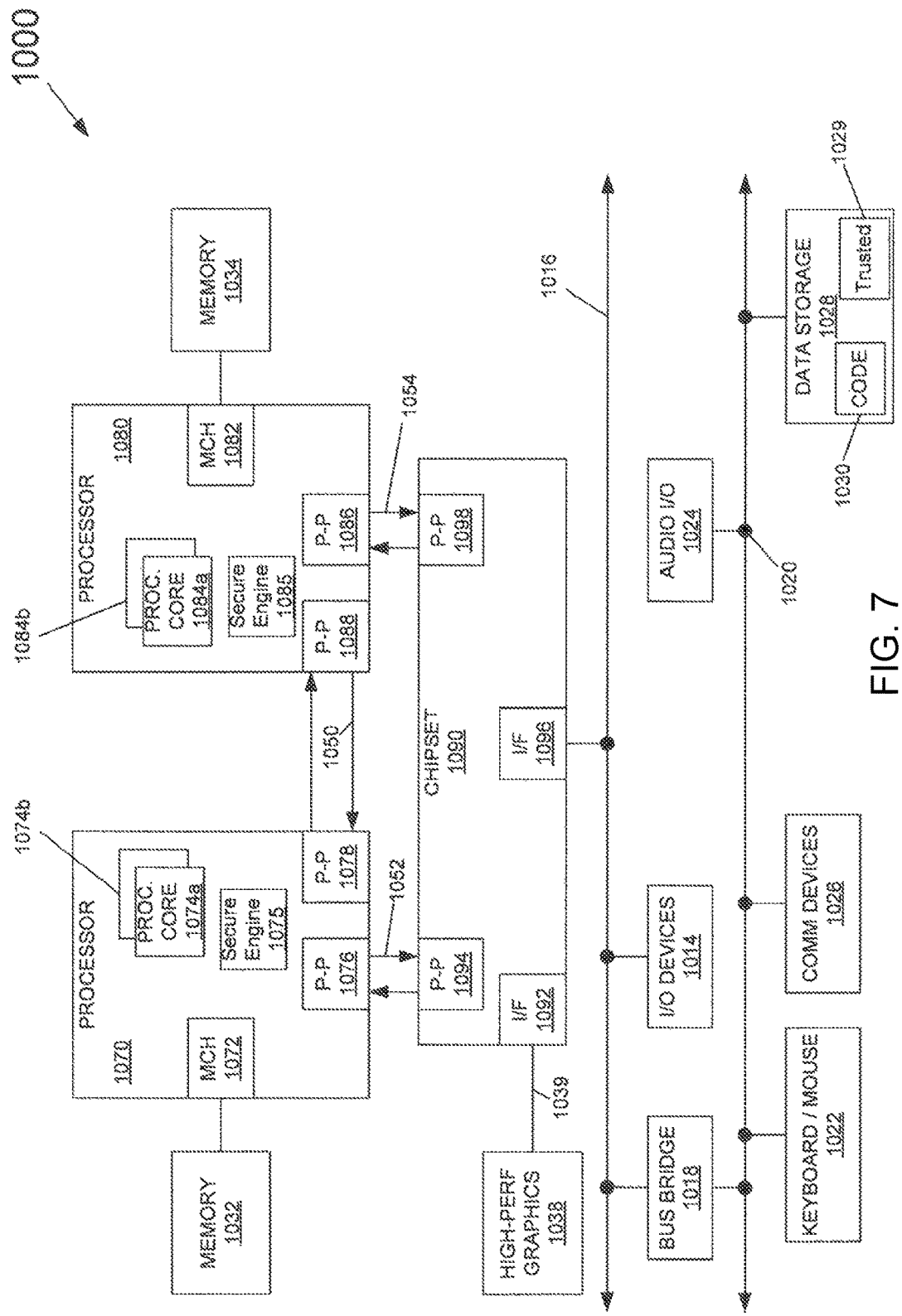
FIG. 7 is a block diagram of a system in accordance with another embodiment of the present invention.

Referring now to FIG. 7, shown is a block diagram of a system in accordance with another embodiment of the present invention. As shown in FIG. 7, multiprocessor system 1000 is a point-to-point interconnect system such as a server system, and includes a first processor 1070 and a second processor 1080 coupled via a point-to-point interconnect 1050. As shown in FIG. 7, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as attestations, IoT network onboarding or so forth.

Still referring to FIG. 7, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 7, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 7, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 7, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 8:
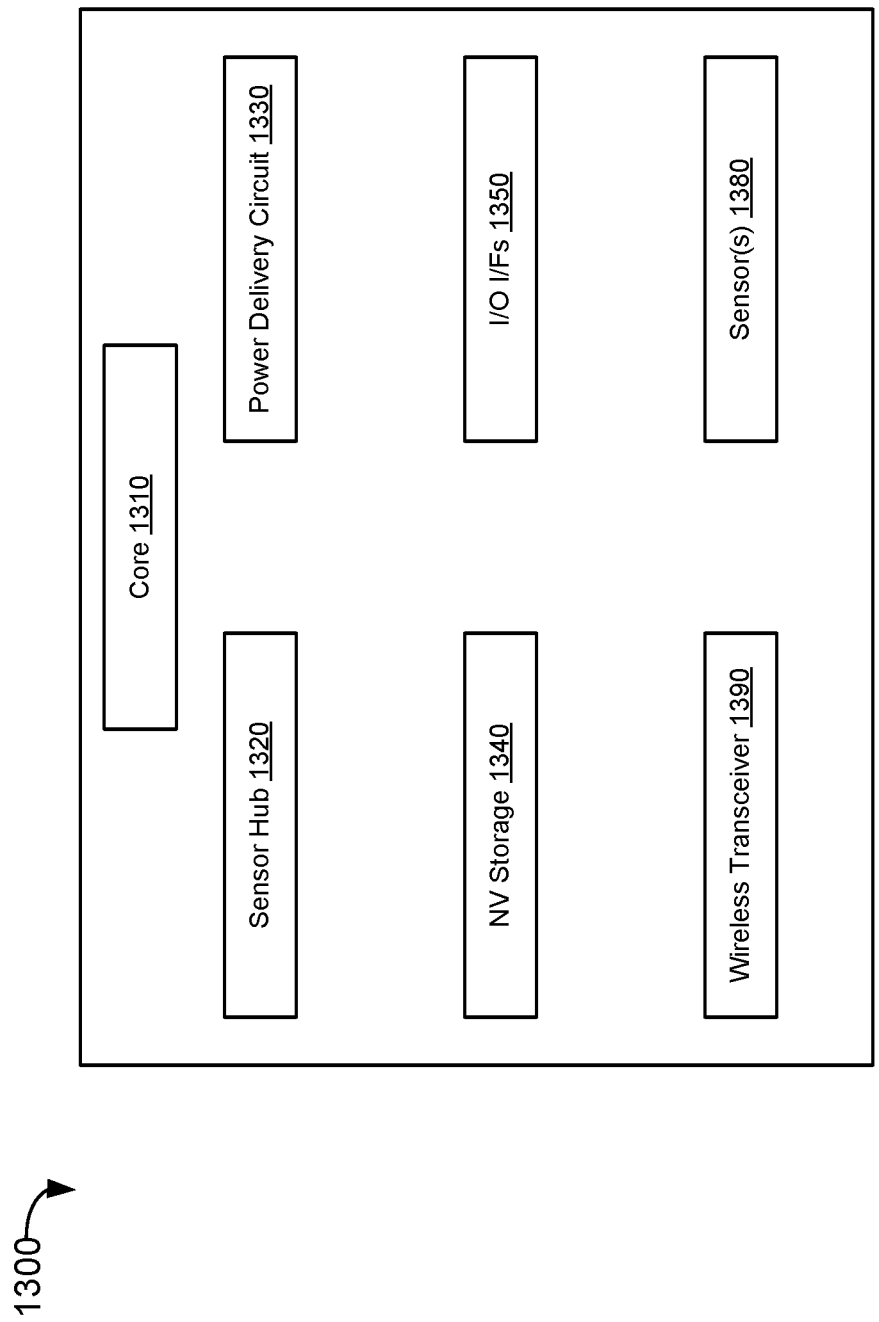
FIG. 8 is a block diagram of a wearable module in accordance with another embodiment.

Embodiments may be used in environments where IoT devices may include wearable devices or other small form factor IoT devices. Referring now to FIG. 8, shown is a block diagram of a wearable module 1300 in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I$^2$C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms.

The following Examples pertain to further embodiments.

In Example 1, an apparatus comprises: a processor; a sensor to sense at least one parameter; a first storage to store the at least one parameter; and a second storage to store a first access control list associated with a first device. The processor may be configured to determine whether to grant an access request received from the first device to access a first resource of the apparatus based on the first access control list. The apparatus and the first device may be coupled in a distributed network having a distributed access control policy in which the apparatus is to locally host access control policy for a first subset of devices and at least one access manager service is to remotely host access control policy for a second subset of devices.

In Example 2, the apparatus of Example 1 is to receive a second request from a second device to access a second resource of the apparatus and forward the second request to the access manager service, where the second device is of the second subset of devices.

In Example 3, the apparatus of one or more of the above Examples is, responsive to a third request received from a third device, to send a redirection message to the third device to cause the third device to send the third request to the access manager service, to cause a third access control list associated with the third device to be dynamically provisioned to the second storage.

In Example 4, the first subset of devices comprises safety-related devices and the second subset of devices comprises non-safety-related devices.

In Example 5, the first device is of the first subset of devices, the first resource and the first device having a common safety label, and an intermediary device is to enable the access request to be sent to the apparatus based at least in part on a subject credential including the common safety label.

In Example 6, the first access control list comprises a subject field to store an identifier of the first device, a resource field to store a resource identifier of the first resource, and a permission field to store one or more access types to be granted to the first device.

In Example 7, the second storage of one or more of the above Examples is to store a third access control list comprising a subject field to store an identifier of a third device, a resource field to store a resource identifier of a third resource of the apparatus, and a distribution field to identify a distributed entity that is to perform an access decision for the third device.

In Example 8, the apparatus of one or more of the above Examples is to be dynamically provisioned with the first access control list based at least in part on a relevance value associated with the first device.

In Example 9, the apparatus of Example 8 is to thereafter delete the first access control list from the second storage based on request activity of the first device.

In Example 10, the apparatus of one or more of the above Examples comprises a sensor device.

In Example 11, the apparatus of one or more of the above Examples further comprises a networking device coupled between the first device and the apparatus. The network device may be configured to enable a first communication from the first device to be delivered to the apparatus, where the first device and the apparatus have a common safety label, the first communication having a first credential associated with the common safety device.

In Example 12, a method comprises: receiving a first request from a first device to access a first resource of the system and determining whether to grant access to the first resource based on a first access control list stored in the system, the first access control list associated with the first device, the first device having a first relevance value, and based on the determination, granting the access to the first resource. The method further comprises receiving a second request from a second device to access a second resource of the system and forwarding the second request to an access manager service coupled to the system to determine whether to grant access to the second resource based on a second access control list stored in the access manager service, the second access control list associated with the second device, the second device having a second relevance value, receiving an access grant from the access manager service and based thereon, granting the access to the second resource.

In Example 13, the method further comprises: receiving a third request from a third device to access a third resource of the system, where at a time of receipt of the third request, the system does not store a third access control list associated with the third device; sending a redirection message to the third device, to cause the third device to send the third request to the access manager service; receiving the third access control list from the third device, the third access control list obtained in the third device from the access manager service; and receiving a fourth request from the third device to access the third resource and determining whether to grant access to the third resource based on the third access control list stored in the system.

In Example 14, the third access control list comprises a signed access control list, and the method further comprises receiving a fifth request from the third device to access the third resource and preventing the access if a signature of the signed access control list is invalid.

In Example 15, the method further comprises storing the first access control list in the system based on the first relevance value and not storing the second access control list in the system based on the second relevance value.

In Example 16, the method further comprises causing the second access control list to be stored in a controller located in a common network portion with the system.

In Example 17, the system comprises a sensor device, the sensor device including a storage to store the first access control list, and where the sensor device is located in a first network portion and is coupled to a controller located in the first network portion, the controller comprising the access manager service to store the second access control list.

In Example 18, the access grant to the first resource comprises one of a create, read, update, delete, notify and publish access.

In Example 19, the method further comprises dynamically provisioning the first access control list into the system and to thereafter deleting the first access control list from the system based on request activity of the first device.

On Example 20, the method further comprises receiving an authorization token from the access manager service, validating the authorization token, and responsive to validation of the authorization token, enabling a fourth device to access a fourth resource of the system.

In Example 21, the method further comprises receiving a resource access request from a requester device to access a requested resource of the system, redirecting the resource access request to the access manager service, and thereafter receiving a token generated by the access manager service, and granting the access to the requested resource.

In another example, a computer readable medium including instructions is to perform the method of any of the above Examples.

In another example, a computer readable medium including data is to be used by at least one machine to fabricate at least one integrated circuit to perform the method of any one of the above Examples.

In another example, an apparatus comprises means for performing the method of any one of the above Examples.

In Example 22, a system comprises: at least one sensor device including a processor and a storage to store a first access control list associated with a first device, where the processor is to determine whether to grant an access request received from the first device to access a first resource of the at least one sensor device based on the first access control list, the at least one sensor device and the first device coupled in a distributed network having a distributed access control policy in which the at least one sensor device is to locally host access control policy for a first subset of devices and at least one access manager service is to remotely host access control policy for a second subset of devices, the at least one sensor device to be located in a first portion of a network. The system may further comprise a first controller coupled to the at least one sensor device, the first controller to control the at least one sensor device, the first controller including a second storage to store a second access control list and to determine whether to allow a second device to access the at least one sensor device based on the second access control list, the first controller located in a second portion of the network.

In Example 23, the first network portion comprises an autonomous network portion and the second network portion comprises a semi-autonomous network portion.

In Example 24, the system of one or more of the above Examples further comprises a server coupled to the first controller, the server comprising an access manager service and a storage to store a third access control list. In turn, the access manager service is to determine whether to allow a third device to access the at least one sensor device based on the third access control list, the server located in a third portion of the network.

In Example 25, the access manager service is to dynamically provision the third access control list to the at least one sensor device as a temporal access control list, to enable the at least one sensor device to perform access control decisions with regard to the third device within a temporal window.

In Example 26, a system comprises: a sensor means for sensing. The sensor means may include a processor means and a storage means for storing a first access control list associated with a first device, where the processor means is for determining whether to grant an access request received from the first device to access a first resource of the at least one sensor device based on the first access control list. The sensor means and the first device may be coupled in a distributed network having a distributed access control policy in which the sensor means is to locally host access control policy for a first subset of devices and at least one access manager service is to remotely host access control policy for a second subset of devices, the sensor means to be located in a first portion of a network. The system may further comprise a first controller means coupled to the at least one sensor device, the first controller means for controlling the at least one sensor device, the first controller means including a second storage means for storing a second access control list and for determining whether to allow a second device to access the sensor means based on the second access control list, the first controller means located in a second portion of the network.

In Example 27, the first network portion comprises an autonomous network portion and the second network portion comprises a semi-autonomous network portion.

In Example 28, the system further comprises a server means coupled to the first controller means, the server means comprising an access manager service and a storage means for storing a third access control list. In turn, the access manager service is to determine whether to allow a third device to access the sensor means based on the third access control list, the server means located in a third portion of the network.

In Example 29, the access manager service is to dynamically provision the third access control list to the sensor means as a temporal access control list, the sensor means for performing access control decisions with regard to the third device within a temporal window.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one computer readable storage medium comprising instructions that when executed enable a system to:
    responsive to a first request from a client device to access a resource of the system, search for an access control entry for the client device pertaining to the resource;
    responsive to absence of the access control entry for the client device pertaining to the resource, provide a message to the client device with an identity of an access manager service of an access manager server, wherein the system comprises a server device;
    receive an access control list from the client device and store the access control list in the system; and
    responsive to a second request from the client device to access the resource, grant access to the resource based on a first access control entry in the access control list of the system, the first access control entry to identify the client device as a subject, to identify the resource, and to identify a permission type associated with the resource and the client device.

2. The at least one computer readable storage medium of claim 1, further comprising instructions that when executed enable the system to:
    responsive to a third request from the client device to access a second resource of the system, grant access to the second resource based on a second access control entry in the access control list of the system, the second access control entry to identify the client device as a subject, to identify the second resource, and to identify a permission type associated with the second resource and the client device.

3. The at least one computer readable storage medium of claim 2, further comprising instructions that when executed enable the system to, responsive to:
    a fourth request from a second client device to access a third resource of the system, deny access to the third resource responsive to absence of an access control policy in the system for the second client device pertaining to the third resource.

4. The at least one computer readable storage medium of claim 2, further comprising instructions that when executed enable the system to:
    responsive to a fifth request from a third client device to access a fourth resource of the system, send information corresponding to the fifth request to the access manager service, wherein an access control entry of a second access control list of the system is to indicate that the system is to consult the access manager service, the access control entry of the second access control list to identify the third client device as a subject, to identify the fourth resource, and to identify the access manager service.

5. The at least one computer readable storage medium of claim 4, further comprising instructions that when executed enable the system to grant the third client device access to the fourth resource in response to a reply from the access manager server.

6. The at least one computer readable storage medium of claim 5, wherein the reply from the access manager service includes an access grant from the access manager service, and further comprising instructions that when executed enable the system based thereon to grant the third client device access to the fourth resource.

7. The at least one computer readable storage medium of claim 1, wherein the client device has a first relevance value, and further comprising instructions that when executed enable the system to store the access control list in the system based on the first relevance value.

8. The at least one computer readable storage medium of claim 1, wherein the message comprises a redirection message.

9. The at least one computer readable storage medium of claim 1, wherein the access control list comprises a signed access control list, and further comprising instructions that when executed enable the system to, responsive to another request from another client device to access the first resource, deny access to the first resource if a signature of the signed access control list is invalid.

10. The at least one computer readable storage medium of claim 1, further comprising instructions that when executed enable the system to grant access to the first resource based at least in part on an identity of the client device.

11. The at least one computer readable storage medium of claim 1, further comprising instructions that when executed enable the system to grant access to the first resource based at least in part on a role of the client device.

12. The at least one computer readable storage medium of claim 1, further comprising instructions that when executed enable the system to grant access to the first resource based at least in part on a group credential to indicate membership of the client device in a group of devices.

13. A method comprising:
responsive to a first request from a client device to access a resource of a system, searching for an access control entry for the client device pertaining to the resource;
responsive to absence of the access control entry for the client device pertaining to the resource, providing a message to the client device with an identity of an access manager service of an access manager server;
receiving an access control list from the client device and storing the access control list in the system; and
responsive to a second request from the client device to access the resource, granting access to the resource based on a first access control entry in the access control list of the system, the first access control entry to identify the client device as a subject, to identify the resource, and to identify a permission type associated with the resource and the client device.

14. The method of claim 13, further comprising, responsive to a third request from the client device to access a second resource of the system, granting access to the second resource based on a second access control entry in the access control list of the system, the second access control entry to identify the client device as a subject, to identify the second resource, and to identify a permission type associated with the second resource and the client device.

15. The method of claim 14, further comprising responsive to a fourth request from a second client device to access a third resource of the system, denying access to the third resource responsive to absence of an access control policy in the system for the second client device pertaining to the third resource.

16. The method of claim 14, further comprising, responsive to a fifth request from a third client device to access a fourth resource of the system, sending information corresponding to the fifth request to the access manager service, wherein an access control entry of a second access control list of the system is to indicate that the system is to consult the access manager service, the access control entry of the second access control list to identify the third client device as a subject, to identify the fourth resource, and to identify the access manager service.

17. A system comprising:
a processor;
a first storage to store a plurality of access control lists; and
a second storage to store instructions that when executed enable the system to:
responsive to a first request from a client device to access a resource of the system, search for an access control entry for the client device pertaining to the resource;
responsive to absence of the access control entry for the client device pertaining to the resource, provide a message to the client device with an identity of an access manager service of an access manager server;
receive an access control list from the client device and store the access control list in the first storage; and
responsive to a second request from the client device to access the resource, grant access to the resource based on a first access control entry in the access control list, the first access control entry to identify the client device as a subject, to identify the resource, and to identify a permission type associated with the resource and the client device.

18. The system of claim 17, wherein the second storage further comprises instructions that when executed enable the system, responsive to a third request from the client device to access a second resource of the system, to grant access to the second resource based on a second access control entry in the access control list, the second access control entry to identify the client device as a subject, to identify the second resource, and to identify a permission type associated with the second resource and the client device.

19. The system of claim 18, wherein the second storage further comprises instructions that when executed enable the system, responsive to a fourth request from a second client device to access a third resource of the system, to deny access to the third resource responsive to absence of an access control policy in the system for the second client device pertaining to the third resource.

20. The system of claim 18, wherein the second storage further comprises instructions that when executed enable the system, responsive to a fifth request from a third client device to access a fourth resource of the system, to send information corresponding to the fifth request to the access manager service, wherein an access control entry of a second access control list stored in the first storage is to indicate that the system is to consult the access manager service, the access control entry of the second access control list to identify the third client device as a subject, to identify the fourth resource, and to identify the access manager service.

* * * * *